United States Patent
Dominguez et al.

(10) Patent No.: US 10,623,385 B2
(45) Date of Patent: Apr. 14, 2020

(54) LATENCY SENSITIVE TACTILE NETWORK SECURITY INTERFACES

(71) Applicant: AT&T Mobility II LLC, Atlanta, GA (US)

(72) Inventors: Brian Dominguez, Atlanta, GA (US); Senthil Ramakrishnan, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 174 days.

(21) Appl. No.: 15/923,607

(22) Filed: Mar. 16, 2018

(65) Prior Publication Data

US 2019/0288990 A1   Sep. 19, 2019

(51) Int. Cl.
*H04L 29/06* (2006.01)

(52) U.S. Cl.
CPC ...... *H04L 63/0485* (2013.01); *H04L 63/0457* (2013.01)

(58) Field of Classification Search
CPC .......................... H04L 63/0485; H04L 63/0457
See application file for complete search history.

(56) References Cited

U.S. PATENT DOCUMENTS

| | | | |
|---|---|---|---|
| 5,805,470 A * | 9/1998 | Averill | G06F 17/5022 703/27 |
| 8,523,667 B2 | 9/2013 | Clavin et al. | |
| 9,172,705 B1 | 10/2015 | Kong et al. | |
| 9,195,815 B2 | 11/2015 | Choong et al. | |
| 9,292,404 B1 | 3/2016 | Schepis et al. | |
| 9,661,091 B2 | 5/2017 | Dawoud Shenouda Dawoud et al. | |
| 9,779,554 B2 | 10/2017 | Stafford et al. | |
| 10,037,025 B2 * | 7/2018 | Pallath | G06F 11/0751 |

(Continued)

OTHER PUBLICATIONS

Kumar, Adarsh et al., "Design and Analysis of Lightweight Trust Mechanism for Secret Data using Lightweight Cryptographic Primitives in MANETs", International Journal of Network Security, vol. 18, No. 1, pp. 1-18, Jan. 2016, pp. 1-18. (Year: 2016).*

(Continued)

*Primary Examiner* — Michael Pyzocha
(74) *Attorney, Agent, or Firm* — Hartman & Citrin LLC

(57) ABSTRACT

Concepts and technologies of latency sensitive tactile network security interfaces are provided herein. In an embodiment, a method can include identifying, by a tactile network interface controller, encrypted command packets that are being sent as a data stream to a tactile application. The method can include obtaining a command sequence model based on the encrypted command packets being sent to the tactile application, and decrypting at least some of the encrypted command packets based on the command sequence model, where decrypting the encrypted command packets identifies non-sequential command instructions. The method can include determining, based on the command sequence model, that at least some of the non-sequential command instructions do not conform to the command sequence model, and dropping, by the tactile network interface controller, the non-sequential command instructions that do not conform to the command sequence model from the data stream.

20 Claims, 5 Drawing Sheets

(56) References Cited

U.S. PATENT DOCUMENTS

| | | | | |
|---|---|---|---|---|
| 2003/0177381 | A1* | 9/2003 | Ofek | H04L 47/10 726/14 |
| 2006/0030891 | A1* | 2/2006 | Saltzstein | G06F 19/3418 607/5 |
| 2006/0041747 | A1* | 2/2006 | Okumura | H04L 9/0894 713/168 |
| 2012/0269341 | A1* | 10/2012 | Hoffmann | G05B 19/0428 380/28 |
| 2015/0193628 | A1* | 7/2015 | Maniatakos | G06F 21/602 713/164 |
| 2015/0207792 | A1* | 7/2015 | Chou | H04L 63/0869 726/17 |
| 2015/0310219 | A1* | 10/2015 | Haager | G06F 21/602 713/165 |
| 2016/0019016 | A1 | 1/2016 | Kochavi | |
| 2016/0026253 | A1 | 1/2016 | Bradski et al. | |
| 2016/0127905 | A1* | 5/2016 | Liu | H04W 12/06 370/338 |
| 2016/0154237 | A1* | 6/2016 | Yu | G08B 6/00 340/407.1 |
| 2017/0084082 | A1 | 3/2017 | McTaggart et al. | |
| 2017/0177504 | A1* | 6/2017 | Desai | H04L 9/003 |
| 2017/0243453 | A1 | 8/2017 | Birnbaum et al. | |
| 2017/0251231 | A1* | 8/2017 | Fullerton | G11B 27/34 |
| 2017/0364159 | A1 | 12/2017 | Eronen et al. | |
| 2019/0098089 | A1* | 3/2019 | Shim | H04L 67/12 |
| 2019/0205570 | A1* | 7/2019 | Liu | G06F 21/602 |

OTHER PUBLICATIONS

Szymanski, Ted, "Securing the Industrial-Tactile Internet of Things With Deterministic Silicon Photonics Switches", IEEE Sep. 26, 2016, pp. 8236-8249. (Year: 2016).*

Maier, Martin et al., "The Tactile Internet: Vision, Recent Progress, and Open Challenges", IEEE Communications Magazine vol. 54, Issue: 5, May 2016 ), pp. 138-145. (Year: 2016).*

McKay et al., "Report on Lightweight Cryptography," National Institute of Standards and Technology, U.S. Department of Commerce, NISTIR 8114, Mar. 2017.

* cited by examiner

LATENCY SENSITIVE TACTILE NETWORK SECURITY INTERFACES

BACKGROUND

As more industries integrate technology into research, work, medicine, and communication, the ability for users to connect with remotely located machines increases. Conventionally, internet service providers can provide a gateway for network connected devices to communicate with each other. Depending on the type of network connection, the network connected devices may experience varying degrees of latency while traversing the network. To the user, network latency can be experienced as a pause or delay in response to commands that are input to a connected device. As more network devices become a part of the internet of things, the conventional network environments can become burdened with routing requests, thereby leading to increases in network latency. In some environments, latency can affect the ability of a network device to provide instructions to a target device in sync with other actions performed by the target device. Moreover, packet loss and jitter can also plague conventional systems, thereby further frustrating the user who may be using a network device that provides tactile output or feedback. Although a network device may connect to a network with varying degrees of bandwidth, the network device may have little ability to control the amount of latency experienced over the network connection. As such, an increase in bandwidth may not necessarily correspond with the ability for a conventional system to handle latency sensitive communications.

SUMMARY

The present disclosure is directed to handling and analyzing latency sensitive network communications between remotely located devices. According to one aspect of the concepts and technologies disclosed herein, a method is disclosed. In some embodiments, the method can include identifying, by a tactile network interface controller, encrypted command packets that are being sent as a data stream to a tactile application. The method can include obtaining, by the tactile network interface controller, a command sequence model based on the encrypted command packets being sent to the tactile application. In some embodiments, the encrypted command packets conform to a user datagram protocol. The method can include decrypting, by the tactile network interface controller, at least some of the encrypted command packets based on the command sequence model, where decrypting the encrypted command packets can identify non-sequential command instructions. In some embodiments, the command sequence model includes a lightweight cryptographic primitive module. The method can include determining, by the tactile network interface controller based on the command sequence model, that at least some of the non-sequential command instructions do not conform to the command sequence model. The command sequence model can identify movement parameters that define at least one, or in some embodiments at least two, of a range of motion, an acceleration rate, a grasping force, an angular rotation rate, a vibration rate, a haptic feedback duration, or any combination thereof. The method also can include dropping, by the tactile network interface controller, the non-sequential command instructions that do not conform to the command sequence model from the data stream.

In some embodiments, the method can further include determining, by the tactile network interface controller, that decrypting at least some of the encrypted command packets occurs over a time period that approaches a latency mitigation limit. The method can include generating, by the tactile network interface controller, a switch instruction that commands an encrypting controller to switch to an alternate lightweight cryptographic primitive module when creating encrypted command packets. In some embodiments, generating the switch instruction can be in response to determining that decrypting at least some of the encrypted command packets approaches the latency mitigation limit. In some embodiments, the method can further include providing, by the tactile network interface controller to a target device associated with the tactile application, the data stream without the non-sequential command instructions that do not conform to the command sequence model. In some embodiments, the tactile application can control a sensor and an actuator that facilitate physical movement of a target device associated with the tactile application based on the data stream that is without the non-sequential command instructions that do not conform to the command sequence model.

According to another aspect of the concepts and technologies disclosed herein, a system of remote user equipment assessment for network connection provisioning is disclosed. The system can include a processor and a memory. The memory can store computer-executable instructions that, when executed by the processor, cause the processor to perform operations. In some embodiments, the operations can include identifying, from a data stream, encrypted command packets that are being sent to a tactile application. In some embodiments, the encrypted command packets can conform to a user datagram protocol. The operations also can include obtaining a command sequence model based on the encrypted command packets being sent to the tactile application. In some embodiments, the command sequence model can include a lightweight cryptographic primitive module. The operations can include decrypting at least some of the encrypted command packets based on the command sequence model, where decrypting the encrypted command packets can identify non-sequential command instructions. The operations can include determining, based on the command sequence model, that at least some of the non-sequential command instructions do not conform to the command sequence model. The operations also can include dropping the at least some of the non-sequential command instructions that do not conform to the command sequence model from the data stream.

In some embodiments, the operations can include determining that decrypting at least some of the encrypted command packets occurs over a time period that approaches a latency mitigation limit. The operations also can include generating a switch instruction that commands an encrypting controller to switch to an alternate lightweight cryptographic primitive module when creating encrypted command packets. In some embodiments, generating the switch instruction can be in response to determining that decrypting at least some of the encrypted command packets approaches the latency mitigation limit. In some embodiments, the operations can include providing, to a target device associated with the tactile application, the data stream that is without the non-sequential command instructions that do not conform to the command sequence model. In some embodiments, the command sequence model identifies movement parameters that define at least one, or in some embodiments at least two, of a range of motion, an acceleration rate, a grasping force, an angular rotation rate, a vibration rate, a haptic feedback duration, or any combination thereof. In some embodiments, the tactile application controls a sensor and an actuator that facilitate physical movement of the target device based on the data stream that is without the non-sequential command instructions that do not conform to the command sequence model.

According to yet another aspect, a computer storage medium is disclosed. The computer storage medium can have computer-executable instructions stored thereon. When the computer-executable instructions are executed by a processor, the processor can perform operations. In some embodiments, the operations can include identifying, from a data stream, encrypted command packets that are being sent to a tactile application. The operations can include obtaining a command sequence model based on the encrypted command packets being sent to the tactile application. In some embodiments, the command sequence model can include a lightweight cryptographic primitive module. In some embodiments, the command sequence model can identify movement parameters that define at least one, or in some embodiments at least two, of a range of motion, an acceleration rate, a grasping force, an angular rotation rate, a vibration rate, a haptic feedback duration, or any combination thereof. The operations can include decrypting at least some of the encrypted command packets based on the command sequence model, where decrypting the encrypted command packets can identify non-sequential command instructions. The operations can include determining, based on the command sequence model, that at least some of the non-sequential command instructions do not conform to the command sequence model, and dropping, from the data stream, the at least some of the non-sequential command instructions that do not conform to the command sequence model. In some embodiments, the operations further include providing, to a target device associated with the tactile application, the data stream without the non-sequential command instructions that do not conform to the command sequence model. In some embodiments, the tactile application can control a sensor and an actuator that facilitate physical movement of the target device based on the data stream that is without the non-sequential command instructions that do not conform to the command sequence model.

In some embodiments, the operations can further include determining that decrypting at least some of the encrypted command packets occurs over a time period that approaches and/or exceeds a latency mitigation limit. The operations can include generating a switch instruction that commands an encrypting controller to switch to an alternate lightweight cryptographic primitive module when creating encrypted command packets. In some embodiments, generating the switch instruction can be in response to determining that decrypting at least some of the encrypted command packets approaches the latency mitigation limit.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
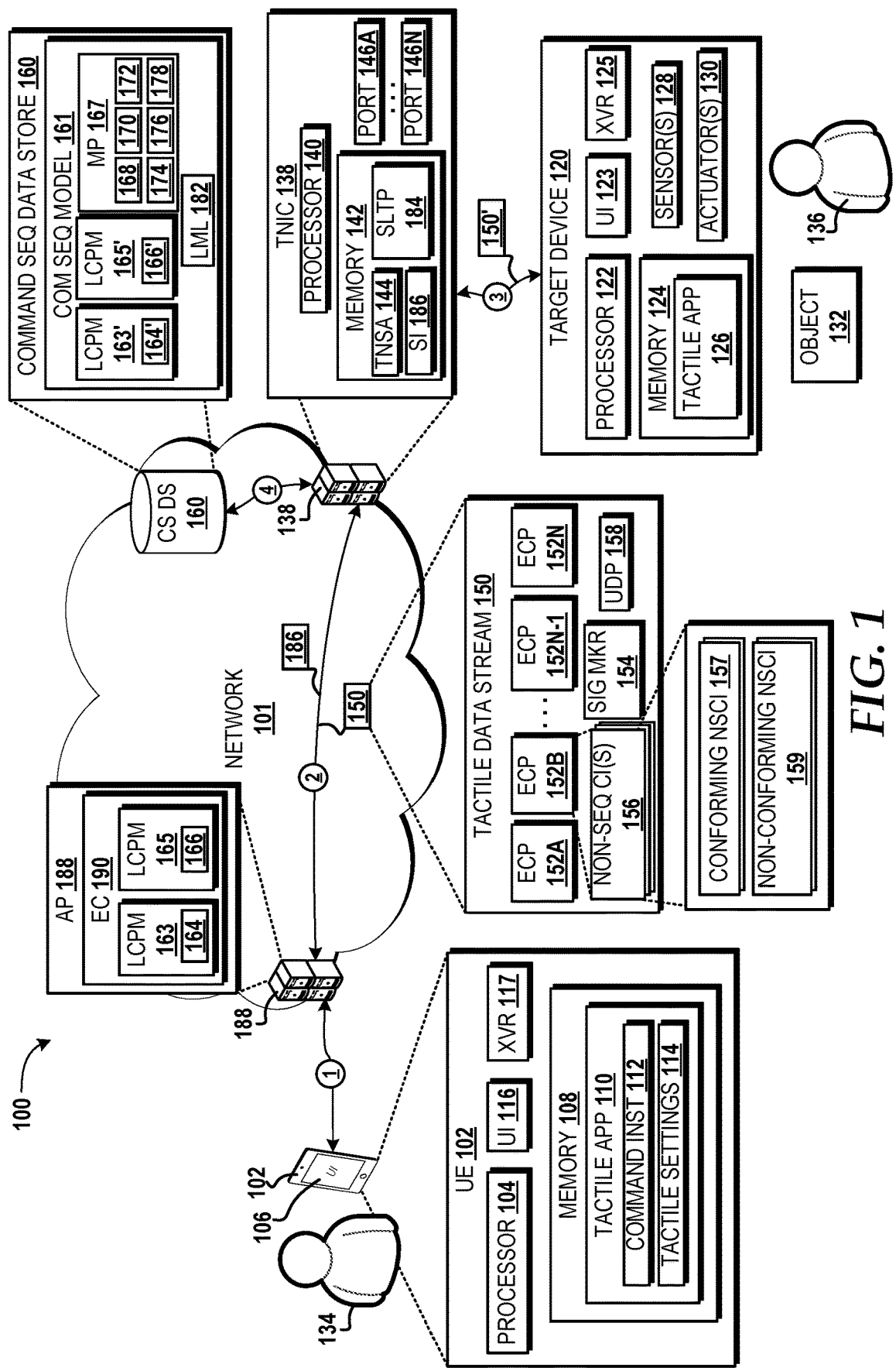
FIG. 1 is a system diagram illustrating an operating environment for tactile network security interfaces that can handle latency sensitive communications for various embodiments of the concepts and technologies described herein.

The following detailed description is directed to the handling of latency sensitive network communications through the use of tactile network security interfaces. As more users interact with technology, the amount of available computing resources can become constrained. In some conventional systems, users would interact with a fixed display to change privacy settings or security parameters for functions including, but not limited to, web browsing, video games, viewing movies, or for parental controls. Increasingly, computing devices have adopted alternate user interfaces that allow for visual, audio, and haptic interaction. For instance, in some computer gaming environments, a user can use a controller and/or gestures to provide input commands when interacting with virtual reality, augmented reality, and/or mixed reality computing environments. Some computing environments may also provide tactile experiences, specifically through haptic feedback and/or articulation of actuators to move objects. A network can provide communications that may be sensitive to network latency and allow for tactile interactions on devices at either end of the communication link. For example, in a computer video gaming environment, a user may wear a network connected article of clothing that includes a sensor and actuator which can provide a sensory experience during gameplay, such as during a virtual car race or a virtual boxing match. In another environment, a medical doctor can provide input commands at a remote location such that the input commands are carried across the network to a target device that can articulate a mechanism to apply force to an object, such as a robotic surgery arm that grasps sutures for a medical procedure.

Network latency can be measured in terms of time elapsed for one-way travel (i.e., the time from the source sending a packet to the destination receiving the packet). However, when calculating network latency, conventional systems may not account for the amount of time that an intermediate network system spends processing a packet. For tactile communications (i.e., network communications that are latency sensitive because the communications should be received by a target device within a defined time limit), the user may perceive network connection speed to be unacceptable, irrespective of the actual bandwidth of the network. In some embodiments, tactile communications can be referred to as a tactile data stream. For tactile communications to be deemed acceptable to the receiving application that causes tactile output (i.e., physical interactions at a target device that appear to a user to occur almost instantaneous from when an input occurred), the network latency must be maintained below a defined time limit, which could be measured in nanoseconds or milliseconds. For example, online games can be sensitive to latency because fast user response times to new virtual event occurrences during a game session are rewarded while slow response times may carry penalties. In a virtual gaming environment, the network latency can be referred to as "lag." A user equipment with a higher latency network connection (i.e., higher lag) than other users may be represented to the online community during gameplay as having slower response times despite an otherwise appropriate and/or faster reaction time than other users. As such a player experiencing less lag may be perceived as having a technical advantage. In the medical or industrial environment using a conventional system, a remote operator that inputs commands on a network may experience network latency by the commands reaching an actuator on a target device a certain time after being sent (e.g., 1 millisecond, 20 milliseconds, etc.), thereby causing movement of an object at a time that is delayed or outside the bounds of what the industry or receiving tactile application defines as acceptable.

However, emphasis on promptness of delivery may cause conventional systems to avoid any analysis of the content of the packets that the network handles. This can leave some target devices open to malicious attack or cause the local target device to perform operations to decide whether the received transmissions should be executed. In some environments, the target devices may have less processing resources and memory resources than back-end computing systems of the network. Therefore, although the data may be delivered to the target device, the target device may have to spend time analyzing the order of the instructions received or may avoid any analysis and blindly implement the commands. However, because tactile communications can configure the target device to provide physical outputs, certain instructions implemented by the target device may cause physical movements that are inappropriate and/or harmful to a user of the target device. In some embodiments, the commands may correspond with movement parameters that are outside acceptable bounds for the user engaging with the target device. For example, a tactile application may execute received commands that cause a motor or actuator to provide a tactile output that, for the particular user or affected object, is deemed to be too forceful, such as for a young adult playing a video game or for an object experiencing grasping forces. Moreover, some developers of tactile applications running on target devices may not allow for customization of the sequence or magnitude of tactile output based on how the tactile outputs affect various users and/or objects.

Therefore, embodiments of the present disclosure can provide handling communications that are directed toward a tactile application and which can be sensitive to network latency. For example, a user may provide input to a user equipment (UE) in the form of command instructions that are intended to be executed by a tactile application on a remotely located target device, such as a gaming application on a gaming system that provides tactile output to other gamers or a medical surgery application that causes a physical output to an object via a motor and/or an actuator on the target device. In some embodiments, the command instructions may be transmitted across the network in a non-sequential order so as to create non-sequential command instructions that could be received and executed by the target application. In some instances, the execution of the non-sequential command instructions could provide a tactile output that is outside the boundaries of an expected movement and could cause a physical movement that is inconsistent with the command instructions. Thus, embodiments of the present disclosure include creation of a command sequence model that provides movement parameters that define boundaries for allowable movements by which the non-sequential command instructions should conform.

In some embodiments, the non-sequential command instructions may be encrypted and sent along a tactile data stream to the target device. An access point may encrypt the tactile data stream using a lightweight cryptographic primitive module prior to the tactile data stream being sent to the target device. Embodiments of the present disclosure include a tactile network interface controller that can intercept the tactile data stream prior to the non-sequential command instructions being executed by a tactile application on the target device. The tactile network interface controller can decrypt at least some encrypted command packets within the tactile data stream by using an instance of the lightweight cryptographic primitive module that was used to encrypt the tactile data stream. Once decrypted, the tactile network interface controller can obtain a command sequence model corresponding to the tactile application that is the intended target of the communications. The command sequence model can include movement parameters that identify characteristics of tactile output deemed acceptable for the target device, such as a range of motion, an acceleration rate, a grasping force, an angular rotation rate, a vibration rate, a haptic feedback duration or other aspects associated with tactile output in the form of physical movement. The tactile network interface controller can identify any non-sequential command instructions that do not conform with the command sequence model. If the tactile network interface controller identifies non-sequential command instructions that do not conform with the command sequence model, such as by falling outside of the movement parameters or having a sequence of instructions that causes the network to incur additional network latency, then the tactile network interface controller can drop the non-sequential command instructions from the tactile data stream. In some instances, the network interface controller can determine the amount of time that was spent for encrypting, decrypting, and/or analyzing the instructions of the tactile data stream. The tactile application on the target device may be associated with a latency mitigation limit that is defined within the command sequence model. If the tactile network interface controller determines that the time spent analyzing the tactile data stream approaches and/or exceeds the latency mitigation limit, then the tactile network interface controller can instruct the access point to switch to an alternate lightweight cryptographic primitive model so as to decrease the amount of processor cycles and time spent decrypting and analyzing the tactile data stream. This can reduce additional network latency while still protecting the target device against potentially harmful instructions. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein for handling latency sensitive communications with a tactile network interface controller will be described, according to an illustrative embodiment. The operating environment 100 shown in FIG. 1 includes a service provider network ("network") 101, a user equipment (UE) 102, an access point 188, a communication path 1, a tactile data stream 150, a tactile network interface controller 138, a communication path 2, a command sequence data store 160, a communication path 3, a communication path 4, a target device 120, an object 132, a user 134, and a target user 136. In some embodiments, a communication service provider can operate and manage the network 101 to provide functionality in accordance with the concepts and technologies disclosed herein for network access to one or more target devices, such as the target device 120. The access point 188, the UE 102, the tactile network interface controller 138, the command sequence data store 160 and the target device 120 can operate in communication with each other and/or as part of the network 101; however, this may not be the case in every embodiment. In some embodiments, the UE 102 and the target device 120 can interact through a third-party cloud service provider that is in communication with the network 101, such as for participating in online gaming, conducting medical procedures, or other remotely located inputs that allow for tactile outputs via network communications through a network platform. It is understood that the examples provided here are for illustration purposes only, and therefore should not be construed as limiting in any way.

The operating environment 100 can include one or more instances of the target device 120 that is associated with the object 132 and/or the target user 136. In various embodiments, the target device 120 can be configured so as to provide tactile output that is physical and can exert a force that acts upon an object (e.g., the object 132) and/or a user (e.g., the target user 136). The target device 120 can be configured to be capable of engaging in communications that are sensitive to network latency based on the particular form the target device 120 embodies. For example, in some embodiments, the target device 120 can include an online video gaming console system that provides tactile output via a wearable vest that vibrates when a user is inflicted with virtual damage. In this embodiment, the target device 120 can be sensitive to network latency because any network latency will affect the speed with which command instructions 112 from the user 134 are felt by the target user 136 via the target device 120. In another embodiment, the target device 120 can take the form of a medical robot that assists in surgery, where the user 134 is a doctor at a remote location giving input for command instructions 112 that the target device 120 uses to provide tactile output and act upon an object (e.g., the object 132) or the target user 136 during surgery. In yet another embodiment, the target device 120 can take the form of a utility robot in a shipping warehouse that receives command instructions 112 to move the object 132 (e.g., a heavy crate) off of a shelf and onto a loading truck. In yet other embodiments, the target device 120 can be configured to include features such as a mobile communications device, a tablet, a wearable computing device (e.g., a smart watch, smart glasses, a gaming vest, etc.), a heads-up display computer system, a vehicle computing system, an attachable computing device, a camera, a gaming system, a television, a handheld device, a robotic assistant, a combination thereof, or other user equipment that can implement network communications and provide tactile output. It is understood that the embodiments discussed herein are for illustration purposes only, and therefore should not be construed as limiting in any way.

In some embodiments, the target device 120 is remotely located from the UE 102, but this may not be the case in all embodiments. In some embodiments, the UE 102 and the target device 120 may be located in substantially the same or proximate location, however the communications paths by which the UE 102 and the target device 120 communicate (e.g., the communication path 1, the communication path 2, and the communication path 3) may still traverse the network 101. In some embodiments, the target user 136 may be the same as the user 134 that provides the inputs. Similarly, the device providing the inputs to the network may also be the device that is the target of the output. Put differently, in some embodiments, the UE 102 may also be the target device 120. As such, the examples provided herein are for illustration purposes only, and should not be construed as limiting the scope of the potential embodiments of the disclosure in any way.

The target device 120 can include one or more instances of a processor 122, a user interface 123, a memory 124, a transceiver 125, a sensor 128, and an actuator 130. The processor 122 can provide compute resources and be configured by a tactile application 126 stored in the memory 124. The processor 122 can be communicatively coupled to the sensor 128 and the actuator 130. Embodiments of the sensor 128 can include, but should not be limited to, temperature sensors, light sensors, air quality sensors, movement sensors, orientation sensors, noise sensors, proximity sensors, or the like. It should be understood that the sensor 128 can include, but should not be limited to, accelerometers, magnetometers, gyroscopes, infrared sensors, noise sensors, microphones, combinations thereof, or the like. The actuator 130 can provide tactile output in the form of physical movements and/or articulation that can exert a force on a body external to the target device 120 (e.g., the object 132 and/or the target user 136). The actuator 130 can be a continuously variable actuator. The actuator 130 can be configured to receive commands from the processor 122 based on execution of the tactile application 126. Put differently, the tactile application 126 can configure the processor 122 that, in turn, commands the actuator 130 to perform movements that allow for tactile output by the target device 120. In some embodiments, the target device 120, or portions thereof, can move about an environment and/or exert a physical output that can act upon an environment. In some embodiments, the actuator 130 can be a part of a mechanical movement system of the target device 120 that can include a motor, gears, pistons, wheels, and/or other mechanisms that can provide a tactile output. In some embodiments, the target device 120 can include a motor (not shown). Examples of a motor that can reside on the target device 120 can include a vibration motor, electric motor, shaftless motor, or the like. The motor also can provide tactile output based on the instructions received by the tactile application 126 that remain present in the tactile data stream 150. It should be understood that the examples provided are for illustration purposes only, and therefore should not be construed as limiting in any way. The tactile application 126 can configure the processor 122 to provide commands to the actuator 130, which in turn can apply a tactile output on the object 132 and/or the target user 136. The object 132 can include any physical object by which the target device 120 can exert a physical force (i.e., tactile output) on the object 132 based on execution of the tactile application 126. In various embodiments, the target device 120 can operate within specified ranges of motions and/or characteristics of how tactile output should be produced by the target device 120. In some embodiments, the specified ranges of motion and characteristics of tactile output can be defined as movement parameters 167 that are stored in a command sequence model 161, which will be described in further detail below.

The operating environment 100 can include one or more instances of the UE 102. In some embodiments, the UE 102 may be associated with the user 134. In various embodiments, the UE 102 can be configured to take the form of a mobile communications device, a tablet, a wearable computing device (e.g., a smart watch, smart glasses, a gaming vest, etc.), a heads-up display computer system, a vehicle computing system, an attachable computing device, a camera, a gaming system, a television, a handheld device, a combination thereof, or other user equipment that can implement network communications. The UE 102 can include a processor 104 that provides compute resources, and a memory 108 that provides temporary and/or permanent storage operations. In some embodiments, the memory 108 and/or other hardware of the UE 102 can store a tactile application 110 that corresponds with the tactile application 126 on the target device 120. The UE 102 can include a transceiver 117 that allows for bi-directional communication with the network 101 over one or more instances of the communication path 1. The UE 102 also can include a display 106 that can present a user interface 116. In some embodiments, the display 106 and the user interface 116 can be configured to receive input from the user 134 via touch input, audio input, visual input (e.g., gestures or other movements), or any combination thereof. The UE 102 can be used for providing input that is translated into machine instructions that are executable by the tactile application 126 of the target device 120 so as to provide tactile output. Specifically, the user 134 can provide an input via the user interface 116 that is presented by the tactile application 110. The tactile application 110 executing on the UE 102 can be a copy and/or an instance of the tactile application 126 that executes on the target device 120. The input from the user 134 can be translated by the tactile application 110 into one or more command instructions 112 that can be sent, via the network 101, to the tactile application 126 executing on the target device 120. The command instructions 112 can be used by the tactile application 126 to control and/or provide tactile output, such as via movement of the actuator 130. In some embodiments, the sensor 128 can provide data to the UE 102, and can be presented on the user interface 116 for display to the user 134. In some embodiments, the command instructions 112 can be generated based on data that is generated by the sensor 128 of the target device 120. The tactile application 110 can send the command instructions 112 to the target device 120 via connection to the network 101. It is understood that the UE 102 can control and/or provide commands to one or more instances of the target device 120. As such, the examples provided herein are for illustration purposes only and should not be construed as limiting in any way.

The network 101 can be supported by one or more compute resources, memory resources, and/or other resources. For example, the compute resource(s) can include one or more particular hardware devices that perform computations to process data, and/or to execute computer-executable instructions of one or more application programs, operating systems, and/or other software, including applications that provide, at least in part, the IP-based and core communication services. The compute resources can include one or more central processing units ("CPUs") configured with one or more processing cores, and/or one or more graphics processing unit ("GPU") configured to accelerate operations performed by one or more CPUs. The compute resources can include one or more system-on-chip ("SoC") components along with one or more other components, including, for example, one or more of the memory resources, and/or one or more of the other resources. The memory resource(s) can include one or more hardware components that perform storage operations, including temporary or permanent storage operations. In some embodiments, the memory resource(s) include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources. The other resource(s) can include one or more hardware and/or virtual resources, one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like. The network 101 can include a radio access network, an evolved packet core network, a core network, an IP-based network, a circuit switched network, a new radio (NR) network, a mobile a Wide Area Network, and/or a combination thereof. In some embodiments, the compute resources, the memory resources, and/or the other resources can collectively function to enable network traffic for the tactile data stream 150 across the network 101. Additional details of aspects of the network 101 are illustrated and described below with reference to FIG. 3.

The network 101 can include one or more instances of the access point 188 that can facilitate communicative coupling between the UE 102 and the network 101. Although one instance of the access point 188 is illustrated in FIG. 1, it is understood that multiple instances of the access point 188 can be included in various embodiments. The access point 188 can provide wired and/or wireless communicative coupling and can include a base station, a wireless router, a gateway server, a femtocell, an eNode B, a NodeB, a gNode B (i.e., an access point that incorporate new radio access technology, such as LTE-Advanced and other 5G technology) and/or other network nodes that can facilitate communication between the UE 102 and the network 101. It is understood that the examples provided herein are for illustration purposes only, and therefore should not be construed as limiting in any way. The access point 188 can include an encrypting controller 190. The encrypting controller 190 can be configured as an application and/or firmware that executes by a processor on the access point 188. In some embodiments, the encrypting controller 190 can be referred to as an encrypting controller application. The encrypting controller 190 can execute a lightweight cryptographic primitive module, such as the lightweight cryptographic primitive module 163. In some embodiments, the access point 188 can also store another instance of a lightweight cryptographic primitive module, such as the lightweight cryptographic primitive module 165. It is understood that use of the term "module" in the claims refers to an executable set of instructions that (re)configures a processor of a particular machine (e.g., the access point 188) and therefore should not be construed as referring to an abstract idea. It is understood that the term "lightweight" as used herein refers to a type of cryptographic primitive module that is hardware-oriented (i.e., configured to execute in a manner that utilizes the full extent of hardware resources) and is optimized to reduce network latency by lowering the amount of processor cycles and lowering block size (e.g., 32, 64, or 128 bits), thereby lowering the time that elapses during encryption and/or decryption of data when compared to conventional cryptographic schemes that require larger block size (e.g., at least 64 bits or 128 bits) and take more time to perform encryption and/or decryption of data.

Each of the lightweight cryptographic primitive modules 163, 165 can correspond with at least one or more of a type of executable cipher data structure, such as but not limited to a lightweight block cipher, a lightweight hash function, a message authentication code, and/or a lightweight stream cipher. In some embodiments, each of the lightweight cryptographic primitive modules 163, 165 corresponds with a unique lightweight block cipher. An example of a conventional cryptographic primitive block cipher can include the Advanced Encryption Standard with a block size of 128 bits. In contrast, embodiments of unique lightweight block ciphers that are configured as lightweight cryptographic primitive modules can include, but should not be limited to, at least one of KATAN and KTANTAN by Christophe de Cannier, et al; PRINCE by Julia Borghoff, et al; and PRESENT by A. Bogdanov, et al. For example, in an embodiment, the lightweight cryptographic primitive module 163 can correspond with the KATAN lightweight block cipher, and the lightweight cryptographic primitive module 165 can correspond with the PRINCE lightweight block cipher. It is understood that the examples provided are for illustration purposes only.

In some embodiments, the encrypting controller 190 of the access point 188 can determine a latency mitigation indicator 164 based on the lightweight cryptographic primitive module 163 being used to encrypt data. For example, the latency mitigation indicator 164 can identify an amount of time (e.g., in nanoseconds) that elapses when the encrypting controller 190 uses the lightweight cryptographic primitive module 163 to encrypt the command instructions 112 during creation of the tactile data stream 150. Similarly, a latency mitigation indicator 166 can identify an amount of time (e.g., in nanoseconds) that elapses when the encrypting controller 190 uses the lightweight cryptographic primitive module 165 to encrypt the command instructions 112 during creation of the tactile data stream 150. Thus, the latency mitigation indicators 164, 166 can define an amount of time that elapses due to encrypting and/or decrypting data due to the use of a particular lightweight cryptographic primitive module. In some instances, the latency mitigation indicators 164, 166 can be included in a supplemental latency time period 184, which is discussed below with respect to the command sequence model 161. Each of the latency mitigation indicators 164, 166 can correspond to different time values based on the respective lightweight cryptographic primitive module. For example, the lightweight cryptographic primitive module 163 implementing the KATAN lightweight block cipher may have a latency mitigation indicator 164 of 10 nanoseconds, while the lightweight cryptographic primitive module 165 implementing the PRINCE lightweight block cipher may have a latency mitigation indicator 166 of 8 nanoseconds. In some embodiments the encrypting controller 190 may initially use a lightweight cryptographic primitive module that is slower (i.e., greater latency mitigation indicator) based on consumption of a less amount of processing resources. It is understood that the examples used herein are for illustration purposes only, and therefore should not be limiting in any way.

In various embodiments, the command instructions 112 can be sent to the target device 120 via a tactile data stream, such as the tactile data stream 150. The tactile data stream 150 can be communicated over the network 101 via a plurality of network nodes (e.g., network routers, switches, servers, links, etc.) which have been omitted from FIG. 1 for clarification purposes only. It is understood that one of ordinary skill in the art would appreciate various network layers and back-end network support that is used for network communications, such as through the use of multiprotocol label switching, or the like. In some embodiments, the tactile data stream 150 can conform to a User Datagram Protocol (UDP), which may be indicated within the tactile data stream 150 by a UDP identifier 158. The UDP is a protocol that is documented in the Internet Engineering Task Force Internet Standard Request for Proposal 768. The UDP is conventionally used as a transport layer protocol and conventionally does not account for message order, message delivery confirmation, or information about the state of message packets. In some embodiments, the tactile data stream 150 can satisfy the requirements of UDP, and the tactile data stream 150 can also provide additional features beyond those offered by the conventional UDP. The tactile data stream 150 can include a plurality of encrypted command packets, such as encrypted command packets 152A-152N. The encrypted command packets 152A-152N can be created by the encrypting controller 190 executing one of the lightweight cryptographic primitive modules (e.g., one of the lightweight cryptographic primitive modules 163, 165) to encrypt the command instructions 112 and break up the command instructions 112 into packets that are sent along the communication path 2. It is understood that the amount of the encrypted command packets 152A-152N can vary based on the memory size of the command instructions 112. In some embodiments, the tactile data stream 150 can include a signature marker 154 that identifies the source of the encryption, such as whether the encrypting controller 190 is executing the lightweight cryptographic primitive module 163 or the lightweight cryptographic primitive module 165.

The command instructions 112 within the encrypted command packets 152A-152N may be transmitted from the access point 188, through the tactile network interface controller 138, and to the target device 120. However, in some embodiments, one or more of the encrypted command packets 152A-152N may include non-sequential command instructions, such as the non-sequential command instructions 156 present within the encrypted command packet 152B shown in FIG. 1. As used herein, the phrase "non-sequential command instructions" refers to command instructions sent from a tactile application (e.g., the command instructions 112 sent from the tactile application 110) that have been broken into segments, encrypted into encrypted command packets (e.g., the encrypted command packets 152A-152N created by the encrypting controller 190 encrypting the command instructions 112), and sent through the network without a specific order or sequence, so as to be executable by a tactile application on a target device for tactile output (e.g., the tactile application 126 on the target device 120 for tactile output via the actuator 130). In some embodiments, the non-sequential command instructions 156 may conform to the command sequence model 161, such as by the non-sequential command instructions 156 comprising a command instruction value that is within the bounds of the movement parameters 167 defined in the command sequence model 161. However, some of the non-sequential command instructions 156 may be considered as not conforming to the command sequence model 161 when the command instruction has a value that is outside the bounds of the movement parameters 167 of the command sequence model 161. Further discussion of conformance with the command sequence model 161 is provided below.

The network 101 can include one or more instances of a command sequence data store, such as the command sequence data store 160. The command sequence data store 160 can be accessible by at least the access point 188 and/or the tactile network interface controller 138. The command sequence data store 160 can include a command sequence model 161 that is associated with a tactile application, such as the tactile application 126 on the target device 120. Although one command sequence model 161 is illustrated in FIG. 1, it is understood that in various embodiments the command sequence data store 160 can store a plurality of command sequence models, where each command sequence model can correspond with a particular tactile application that resides on various target devices. In some embodiments, a unique command sequence model 161 can exist for a particular target device (e.g., the target device 120), and the command sequence model 161 can include information corresponding to one or more tactile applications residing on the particular target device.

The command sequence model 161 can include one or more lightweight cryptographic primitive modules, such as the lightweight cryptographic primitive module 163' and the lightweight cryptographic primitive module 165'. Each of the lightweight cryptographic primitive module 163' and the lightweight cryptographic primitive module 165' can be copies, instances, or otherwise substantially similar to the lightweight cryptographic primitive module 163 and the lightweight cryptographic primitive module 165 executed by the encrypting controller 190. Similarly, latency mitigation indicators 164', 166' can reflect the time values identified in the latency mitigation indicators 164, 166. By this, a tactile network security application 144 can determine which lightweight cryptographic primitive module can be used to further reduce network latency. The tactile network security application 144 can be executed by the tactile network interface controller 138 to analyze the tactile data stream 150 and determine whether information contained therein conforms to the command sequence model 161. The tactile network security application 144 can intercept and analyze the tactile data stream 150 prior to the tactile application 126 receiving the non-sequential command instructions 156 within the tactile data stream 150.

The command sequence model 161 can identify values by which to determine whether non-sequential command instructions (e.g., the non-sequential command instructions 156) are in conformance with expected values and/or patterns for a particular tactile application, such as the tactile application 126. For example, the command sequence model 161 can include the one or more movement parameters 167. Examples of the movement parameters 167 can include, but should not be limited to, a range of motion parameter 168 (e.g., measured in linear and/or angular distance), an acceleration rate parameter 170, a grasping force parameter 172, an angular rotation rate parameter 174, a vibration rate parameter 176, a haptic feedback duration parameter 178, or any combination thereof. The command sequence model 161 can include a latency mitigation limit 182 that is associated with the tactile application 126. The latency mitigation limit 182 can be a time value, such as milliseconds, nanoseconds, or the like. The latency mitigation limit 182 can indicate a maximum amount of time that the tactile network security application 144 on the tactile network interface controller 138 is allowed to use for encrypting, decrypting, and/or analyzing one or more encrypted command packets 152A-152N to determine conformance with the command sequence model 161. It is understood that the latency mitigation limit 182 can be based on the tactile application 126. In some embodiments, the tactile network security application 144 can dynamically adjust the latency mitigation limit 182 based on the congestion of the network 101 so as to ensure that latency-sensitive communications, such as the tactile data stream 150, is provided to the tactile application 126 in an expedient manner.

In some embodiments, the command sequence model 161 can be updated and/or reconfigured based on tactile settings 114 that are provided by input from the user 134. For example, the user 134 can input the tactile settings 114 to alter and/or update one or more of the movement parameters 167 corresponding to a particular tactile application, such as the tactile application 126. In some embodiments, the tactile settings 114 can provide one or more user defined policies that define the specific movement parameters and/or other settings that are (un)allowed and/or (un)authorized to be performed on the target device 120. The user defined policies can be provided based on user input, such as from the user 134 and/or the target user 136. In some embodiments, the tactile settings 114 can be provided using a network connected device (e.g., the target device 120 and/or the UE 102), thereby allowing user defined policies to be set from any connection to the network 101. In some embodiments, the tactile application 126 may be associated with an online virtual game that is played by the target user 136 who is a child. The user 134 may, in some embodiments, take the form of a parent or guardian that inputs the tactile settings 114 to alter one or more of the movement parameters 167 to ensure that the target user 136 is not intentionally or unintentionally subjected to forces and/or movements by the actuators 130 that are inappropriate for the target user 136 and/or could cause harm to the object 132 (e.g., a nearby pet or piece of furniture). In another embodiment, the user 134 could be an assembly worker that inputs the tactile settings 114 because the target device 120 may have had a new robotic arm installed and therefore the movement parameters 167 should be adjusted to account for the increased and/or decreased range of motion 168 and/or a change in the acceleration rate parameter 170. It is understood that the examples provided are for illustration purposes only, and therefore should not be limiting in any way.

The network 101 can include one or more instances of the tactile network interface controller 138. In some embodiments, the tactile network interface controller 138 can be at a provider edge of the network 101, such as being located at a network gateway, base station, and/or access point by which the tactile data stream 150 is routed to the target device 120. The tactile network interface controller 138 can be communicatively coupled with the access point 188 via the communication path 2, with the command sequence model 161 via the communication path 4, and with the target device 120 via the communication path 3. It is understood that the communication paths 1-4 can include wired and/or wireless links that provide electrical and/or optic transmission of communications. The tactile network interface controller 138 can include a server, an access point, system on a chip, or other circuitry that forms a particular machine at a provider edge. The tactile network interface controller 138 can include a processor 140, a memory 142, and one or more ports, such as the port 146A-146N. The processor 140 can include compute resources, such as discussed above, and the memory 142 can include storage resources, such as discussed above. It is understood that the memory 142 does not include signals per se. The memory 142 can include the tactile network security application 144 that can detect communications that are sensitive to network latency, such as the tactile data stream 150. In some embodiments, the tactile network security application 144 can monitor and manage a plurality of virtual and/or physical ports and/or access points by which communications can reach the target device 120. In various embodiments, the tactile network security application 144 can identify the signature marker 154 within communications traversing the ports 146A-146N, and in response, determine that one or more encrypted command packets (e.g., the encrypted command packets 152A-152N) correspond with latency-sensitive communications that should be decrypted and analyzed for compliance with a command sequence model, such as the command sequence model 161.

The tactile network security application 144 can identify one or more of the encrypted command packets 152A-152N of the tactile data stream 150 that are being sent to a tactile application, such as the tactile application 126. In some embodiments, the tactile application 126 can be associated with the signature marker 154 that is included within a header of the tactile data stream 150 that includes one or more of the encrypted command packets 152A-152N. The tactile network security application 144 can use the signature marker 154 to access the command sequence data store 160 and obtain the command sequence model 161 corresponding to the tactile application 126. The command sequence model 161 can indicate that the lightweight cryptographic primitive module 163 was used for encryption of the tactile data stream 150. Because the lightweight cryptographic primitive module 163 used by the encrypting controller 190 corresponds with the lightweight cryptographic primitive module 163' of the command sequence model 161, the tactile network security application 144 can execute the lightweight cryptographic primitive module 163' to decrypt one or more of the encrypted command packets 152A-152N. By decrypting one or more of the encrypted command packets 152A-152N, the tactile network security application 144 can identify non-sequential command instructions, such as the non-sequential command instructions 156, as being associated with the tactile application 126 (e.g., via a header and/or the signature marker 154). When the command instructions 112 are sent to the access point 188 and encrypted by the encrypting controller 190, at least some portion of the command instructions 112 may be broken up into a non-sequential order and encapsulated as the encrypted command packets 152A-152N. Thus, each of the encrypted command packets 152A-152N can include one or more instances of non-sequential command instructions, such as the non-sequential command instructions 156. The non-sequential command instructions 156 can include one or more conforming non-sequential command instructions 157, and one or more non-conforming non-sequential command instructions 159. The non-conforming non-sequential command instructions 159 refers to at least some portion of non-sequential command instructions 156 that does not conform with one or more of the movement parameters 167 of the command sequence model 161 and if executed by the tactile application 126, could and/or would result in a tactile output by the target device 120 (e.g., via the actuator 130) that is outside the bounds of the movement parameters 167 and could cause harm and/or injury on a target user and/or object. The conforming non-sequential command instructions 157 refers to at least some portion of the non-sequential command instructions 156 that are within the bounds of the movement parameters 167 and/or conform with the command sequence model 161. The command sequence model 161 can indicate one or more of the movement parameters 167 that define bounds that are acceptable and would not cause harm or inappropriate tactile output by the target device 120. The tactile network security application 144 can analyze the non-sequential command instructions 156 using the command sequence model 161 and determine that one or more of the values are within boundaries identified in the movement parameters 167. However, in some embodiments, the tactile network security application 144 can determine that at least some of the non-sequential command instructions 156 are not in conformance with one or more of the movement parameters 167 of the command sequence model 161.

For example, the target device 120 may include a haptic feedback vest and/or glove that the target user 136 wears. In this example, the command instructions 112 may include instructions that command the target device 120 to provide tactile output (e.g., through a motor or mechanical assembly) that exerts a force on the target user 136 at a vibration rate for a specified duration. In this example, the tactile network security application 144 may determine that the non-sequential command instructions 156 are within the bounds indicated by the vibration rate parameter 176 and the haptic feedback duration parameter 178 identified in the command sequence model 161. Moreover, because no other instructions within the encrypted command packets 152A-152N cause the target device 120 to exceed the movement parameters 167, then the tactile network security application 144 can determine that the non-sequential command instructions 156 are in conformance with the command sequence model 161 for the tactile application 126 (i.e., are conforming non-sequential command instructions 157).

However, in another example, the non-sequential command instructions 156 may include one or more instructions that command the target device 120 to provide tactile output that causes the vibration rate of the feedback vest or glove to increase for an extended period of time. The tactile network security application 144 can determine that although these non-sequential command instructions 156 indicate a vibration rate that is in conformance with the vibration rate parameter 176, the duration of the vibration is too long and exceeds the haptic feedback duration parameter 178. Thus, the portion of the non-sequential command instructions 156 that indicates the vibration rate is within the vibration rate parameter 176 would be deemed as conforming non-sequential command instructions 157. The tactile network security application 144 can flag the particular one or more non-sequential command instruction 156 that exceed the haptic feedback duration parameter 178 as being in non-conformance with the command sequence model 161 (i.e., non-conforming non-sequential command instructions 159).

The tactile network security application 144 can determine that one or more of the movement parameters 167 would be violated if the non-conforming non-sequential command instructions 159 were to be executed by the target device 120. Thus, once the tactile network security application 144 determines, based on the movement parameters 167, that at least some of the non-sequential command instructions 156 do not conform to the command sequence model 161, the tactile network security application 144 can drop, crop, or otherwise remove the non-sequential command instructions 156 that do not conform with the command sequence model 161 from the tactile data stream 150. Put differently, the tactile network security application 144 can drop the non-conforming non-sequential command instructions 159 from the tactile data stream 150 before the tactile application 126 of the target device 120 receives information from the tactile data stream 150. The tactile network security application 144 creates a reconfigured tactile data stream 150' by dropping the non-conforming non-sequential command instructions 159 from the non-sequential command instructions 156 of the tactile data stream 150. Stated differently, the tactile network security application 144 can repackage the tactile data stream 150 such that the tactile data stream 150 is without (and therefore no longer comprises) the non-conforming non-sequential command instructions 159, thereby creating the reconfigured tactile data stream 150'. Thus, the tactile network security application 144 can provide the reconfigured tactile data stream 150' to the tactile application 126 of the target device 120 while mitigating network latency and safeguarding the tactile application 126 because the reconfigured tactile data stream 150' no longer comprises the non-conforming non-sequential command instructions 159.

In some embodiments, the tactile network security application 144 also can monitor the amount of time that passes during the process of encrypting, decrypting, and/or analyzing the tactile data stream 150. The tactile network security application 144 can denote the amount of time that passes by creating a supplemental latency time period 184. The tactile network security application 144 can determine the amount of time that elapses during decryption of the one or more encrypted command packets 152A-152N and analysis of the non-sequential command instructions 156 for conformance with the command sequence model 161. The amount of time that elapses for decryption and/or that elapses for analysis can be stored as a supplemental latency time period 184. In some embodiments, the tactile network security application 144 can compare the supplemental latency time period 184 with the latency mitigation limit 182 that corresponds with the command sequence model 161. The latency mitigation limit 182 can refer to a maximum amount of time that is authorized to elapse before the tactile application 126 will begin to notice that at least some of the encrypted command packets 152A-152N have stalled within the network 101. In some instances, the latency mitigation limit 182 can be generated based on the particular tactile application, such as the tactile application 126, that executes on the target device 120. As such, in some embodiments, the command sequence model 161 can include a plurality of latency mitigation limits if more than one tactile application is executable by the target device 120. For example, in an embodiment where the tactile application 126 assists in robotic medical surgery, the latency mitigation limit 182 may be lower than another latency mitigation limit that corresponds with another tactile application that is used for online video games. In various embodiments, the latency mitigation limit 182 can be measured in nanoseconds and/or milliseconds.

In some embodiments, the tactile network security application 144 can determine whether the supplemental latency time period 184 has approached and/or exceeded the latency mitigation limit 182. The tactile network security application 144 can determine that the supplemental latency time period 184 has or is approaching the latency mitigation limit 182 by determining that the supplemental latency time period 184 has passed a certain percentage of the latency mitigation limit 182, such as 95 percent of the latency mitigation limit 182. In some embodiments, when the tactile network security application 144 determines that the supplemental latency time period 184 exceeds and/or has approached the latency mitigation limit 182, then the tactile network security application 144 can identify another lightweight cryptographic primitive module that can encrypt and/or decrypt data faster than the current lightweight cryptographic primitive module in use. In some embodiments, the latency mitigation limit 182 can correspond with 50 nanoseconds, 20 nanoseconds, 10 nanoseconds, or another value that accounts for the amount of time that is allowed to elapse for encryption, decryption, and/or analysis by the tactile network security application 144, as defined in the command sequence model 161. For example, the tactile network security application 144 can determine that the lightweight cryptographic primitive module 163' is in use, and based on comparison of the latency mitigation indicators 164' and 166', can determine that the lightweight cryptographic primitive module 165' can encrypt and/or decrypt faster than using the lightweight cryptographic primitive module 163'. Thus, the tactile network security application 144 can reconfigure the command sequence model 161 to use the lightweight cryptographic primitive module 165' based on the latency mitigation limit 182 and/or network congestion experienced on the network 101, such as at the ports 146A-146N. This can improve the efficiency of processing and handling the tactile data stream 150, while also ensuring that physical devices, objects, and/or users are not harmed from execution of instructions within the tactile data stream 150. Although two lightweight cryptographic primitive modules are illustrated, it is understood that the operating environment 100 can selectively implement more than two lightweight cryptographic primitive modules. It is understood that the examples provided herein are for illustration purposes only, and therefore should not be limiting in any way.

In some embodiments, the tactile network security application 144 can generate a switch instruction 186 that commands the encrypting controller 190 to switch to using the lightweight cryptographic primitive module 165 instead of the lightweight cryptographic primitive module 163 that was previously in use to encrypt the tactile data stream 150. By this, any additional, subsequent command instructions from the UE 102 will be encrypted by the encrypting controller 190 using the lightweight cryptographic primitive module 165 instead of the lightweight cryptographic primitive module 163 that had been used for the encrypted command packets 152A-152N. The tactile network security application 144 can generate the switch instruction 186 in response to determining that decrypting at least some of the encrypted command packets 152A-152N and/or analyzing the non-sequential command instructions 156 cause the supplemental latency time period 184 to approach the latency mitigation limit 182. The tactile network security application 144 can be sent from the tactile network interface controller 138 to the encrypting controller 190 that can reside on one or more instances of the access point 188.

In some embodiments, the tactile network security application 144 can drop, dump, or otherwise purposefully not provide the non-conforming non-sequential command instructions 159 to the tactile application 126 based on at least some of the non-sequential command instructions 156 failing to conform with the command sequence model 161 (i.e., the non-conforming non-sequential command instructions 159). As such, the reconfigured tactile data stream 150' can continue to be provided to the target device 120 via one or more of the ports 146A-146N for execution by the tactile application 126. The tactile application 126 can receive the tactile data stream 150 that, based on the analysis by the tactile network security application 144, contains only instructions that conform with the command sequence model 161. In some embodiments, the tactile network security application 144 decrypts all of the encrypted command packets 152A-152N prior to providing the tactile data stream 150 to the target device 120. In another embodiment, only a portion of the encrypted command packets 152A-152N may have been decrypted and analyzed, and thus the tactile data stream 150 is provided to the tactile application 126 without decrypting all of the encrypted command packets 152A-152N. It is understood that the examples provided are for illustration purposes only, and therefore should not be construed as limiting the scope of the disclosure in any way.

It is understood that zero, one, or more than one instance of the network 101, the UE 102, the processor 104, the display 106, the user interface 116, the transceiver 117, the memory 108, the tactile application 110, the command instructions 112, the tactile settings 114, the communication path 1, the user 134, the access point 188, the encrypting controller 190, the lightweight cryptographic primitive modules 163, 165, the latency mitigation indicators 164, 166, the communication path 2, the tactile data stream 150, the encrypted command packets 152A-152N, the non-sequential command instructions 156, the signature marker 154, the UDP identifier 158, the tactile network interface controller 138, the processor 140, the memory 142, the tactile network security application 144, the switch instruction 186, the identifier for the supplemental latency time period 184, the ports 146A-146N, the command sequence data store 160, the command sequence model 161, the lightweight cryptographic primitive modules 163', 165', the latency mitigation indicators 164', 166', the movement parameters 167, latency mitigation limit 182, the communication path 3, the communication path 4, the target device 120, the processor 122, the user interface 123, the transceiver 125, the memory 124, the tactile application 126, the sensor 128, the actuator 130, the object 132, and the target user 136 can be included within the operating environment 100 shown in FIG. 1. As such, the illustrated embodiment should be understood as being illustrative, and should not be construed as being limiting in any way.

Figure 2:
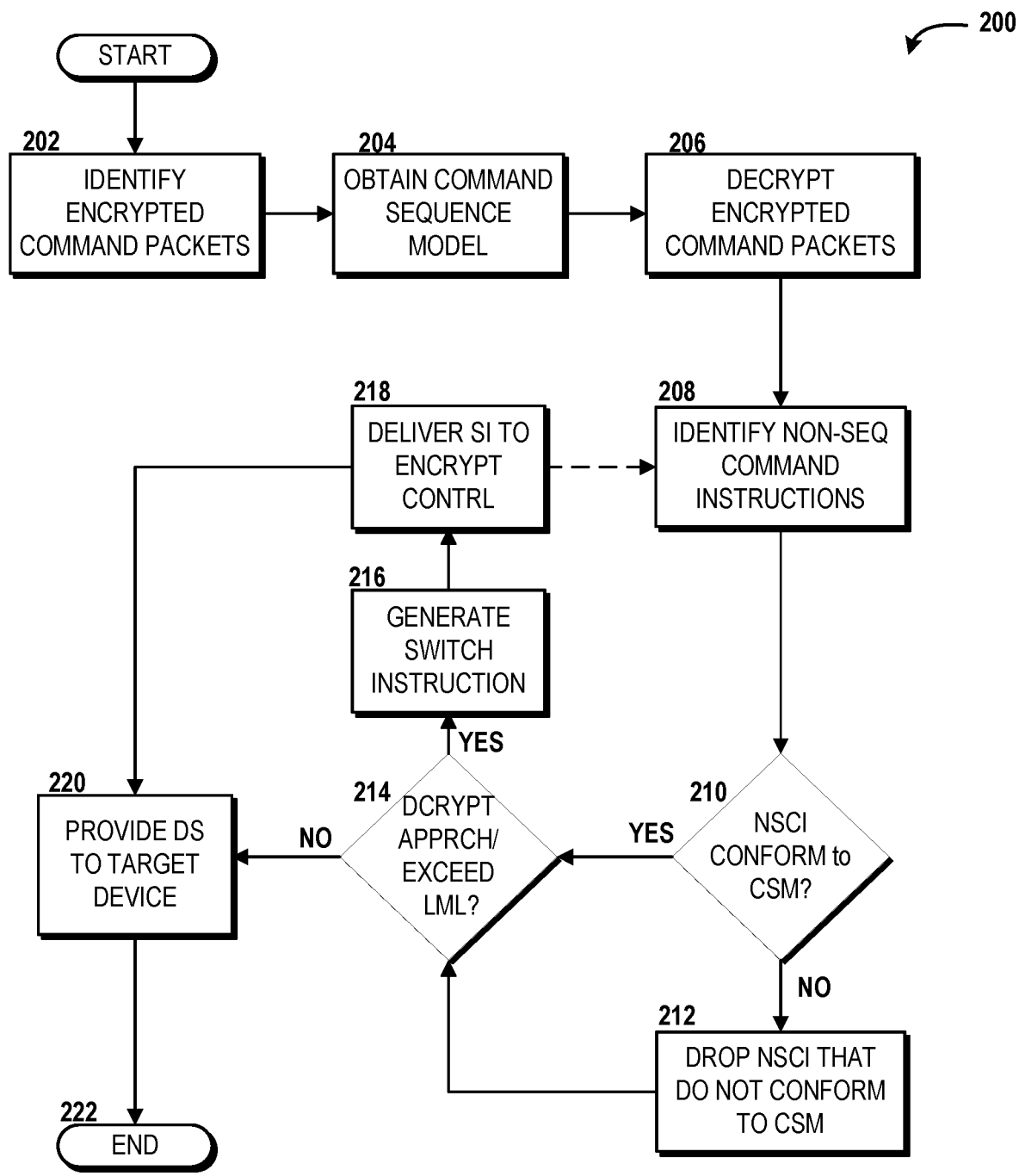
FIG. 2 is a flow diagram showing aspects of a method for tactile network security interfaces handling latency sensitive communications, according to an illustrative embodiment of the concepts and technologies described herein.

Turning now to FIG. 2, aspects of a method 200 for handling latency sensitive communications will be described in detail, according to an illustrative embodiment. It should be understood that the operations of the method disclosed herein (e.g., the method 200) are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, user equipment, mainframe computers, personal computers, network servers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the tactile network interface controller 138, to perform one or more operations and/or causing the processor to direct other components of the computing system or device to perform one or more of the operations.

For purposes of illustrating and describing the concepts of the present disclosure, the methods disclosed herein are described as being performed by the tactile network interface controller 138 via execution of one or more software modules such as, for example, the tactile network security application 144 that configure one or more processors. It should be understood that additional and/or alternative devices and/or network nodes can, in some embodiments, provide the functionality described herein via execution of one or more modules, applications, and/or other software including, but not limited to, the UE 102 executing the tactile application 110, the access point 188 executing the encrypting controller 190, and/or the target device 120 executing the tactile application 126. Thus, the illustrated embodiments are illustrative, and should not be viewed as being limiting in any way.

The method 200 begins at operation 202, where the tactile network security application 144 executing on the tactile network interface controller 138 can identify one or more encrypted command packets 152A-152N of the tactile data stream 150. In some embodiments, the tactile data stream 150 can conform to a user datagram protocol. The command instructions 112 can be packaged and encrypted by the encrypting controller 190, thereby generating the encrypted command packets 152A-152N that collectively form the tactile data stream 150. In some embodiments, one or more sensor 128 of the target device 120 can generate sensor data that is used as a basis to generate at least a portion of the command instruction 112. The tactile data stream 150 can be sent to the tactile network interface controller 138, where the encrypted command packets 152A-152N are received by the tactile network security application 144. In some embodiments, each of the encrypted command packets 152A-152N comprises non-sequential command instructions. The non-sequential command instructions 156 can be portions of the command instructions 112, and the non-sequential command instructions 156 may or may not conform with the command sequence model 161. In some embodiments, identification of one or more of the encrypted command packets 152A-152N can occur by recognizing that the signature marker 154 corresponds with the tactile application 126 that executes on the target device 120. In some embodiments, the signature marker 154 can be identified in the command sequence model 161 that is associated with the tactile application 126. In some embodiments, the encrypted command packets 152A-152N are selected for identification in an (a)periodic interval based on congestion on the network 101. From operation 202, the method 200 can proceed to operation 204, where the tactile network security application 144 can obtain the command sequence model 161 based on identifying the one or more encrypted command packets 152A-152N. The command sequence model 161 can be associated with at least the tactile application 126 that executes on the target device 120 which provides tactile output.

From operation 204, the method 200 can proceed to operation 206, where the tactile network security application 144 can decrypt one or more of the encrypted command packets 152A-152N. In some embodiments, the tactile network security application 144 activates one of the lightweight cryptographic primitive modules that corresponds with the lightweight cryptographic primitive module that was used by the encrypting controller 190 to encrypt the encrypted command packets 152A-152N. For example, if the encrypting controller 190 used the lightweight cryptographic primitive module 163 to encrypt the encrypted command packets 152A-152N, then the tactile network security application 144 can activate the corresponding lightweight cryptographic primitive module 163' from the command sequence data store 160. From operation 206, the method 200 can proceed to operation 208, where the tactile network security application 144 can identify non-sequential command instructions 156 within the tactile data stream 150. The tactile network security application 144 can use the command sequence model 161 to determine that the non-sequential command instructions 156 are associated with one or more of the movement parameters 167 within the command sequence model 161.

From operation 208, the method 200 can proceed to operation 210, where the tactile network security application 144 can determine whether the non-sequential command instructions 156 conform to the command sequence model 161. For example, the tactile network security application 144 can determine that one or more of the non-sequential command instructions 156 pertain to one of the movement parameters 167. The tactile network security application 144 can determine whether the non-sequential command instructions 156 approach (i.e., exceed a defined percentage of a threshold value of the movement parameter) and/or exceed a threshold value provided by the movement parameter. For example, if the non-sequential command instructions 156 include a grasping force command that would instruct the actuator 130 to exert a force that exceeds the grasping force parameter 172, then the tactile network security application 144 would identify the non-sequential command instruction 156 as not conforming to the command sequence model 161, thereby identifying at least some non-conforming non-sequential command instructions 159 within the tactile data stream 150. In some embodiments, the movement parameters 167 may correspond with values that are specific to the target user 136 that will be interacting with the target device 120. Therefore, if the actuator 130 were to execute the non-conforming non-sequential command instructions 159, the target user 136 could be harmed. Thus, the tactile network security application 144 can determine which non-sequential command instructions 156 within one or more of the encrypted command packets 152A-152N do not conform with the command sequence model 161 (i.e., which are non-conforming non-sequential command instructions 159). Although FIG. 1 shows the non-sequential command instructions 156 as corresponding with the encrypted command packet 152B, it is understood that each of the encrypted command packets 152A-152N can include one or more non-sequential command instructions that are based on the command instructions 112 destined for the tactile application 126 of the target device 120.

In an embodiment where one or more of the non-sequential command instructions 156 is in conformance with the command sequence model 161, such as by being within the bounds of the movement parameters 167, then method 200 can proceed along the YES path from operation 210 to operation 214. In embodiments where at least one of the non-sequential command instructions 156 does not conform with the command sequence model 161, then method 200 can proceed along the NO path from operation 210 to operation 212. For clarity, a discussion of operation 212 will be provided first, and then a discussion of operation 214 will be provided below. It is understood that in some embodiments, the operation 214 may occur prior to the operation 212. As such, the examples provided are for illustration purposes only, and should not limit the scope of disclosure in any way.

At operation 212, the tactile network security application 144 can drop, dump, and/or disregard the non-conforming non-sequential command instructions 159 from the tactile data stream 150, thereby providing the reconfigured tactile data stream 150' to the tactile application 126 based on at least some of the non-sequential command instructions 156 failing to conform with the command sequence model 161. In some embodiments, the tactile network security application 144 can drop the non-conforming non-sequential command instructions 159 that do not conform with the command sequence model 161 by overwriting the non-conforming non-sequential command instructions 159 with one or more null values and/or inserting a pointer that instructs the tactile application 126 to skip the non-conforming non-sequential command instructions 159 and instead proceed to execute a subsequent, conforming non-sequential command instructions 157 within the tactile data stream 150.

At operation 214, the tactile network security application 144 can determine whether decrypting one or more of the encrypted command packets 152A-152N has approached and/or exceeded the latency mitigation limit 182. For example, the latency mitigation limit 182 can define a time value (e.g., in nanoseconds and/or milliseconds) that provides a maximum amount of time that the tactile network security application 144 has to perform decrypting the encrypted command packets 152A-152N and analyzing the non-sequential command instructions 156 for non-conformance with the command sequence model 161. In some embodiments, the tactile network security application 144 can create an identifier of the supplemental latency time period 184 that indicates the amount of time that elapsed for decrypting and/or analyzing the non-sequential command instructions 156 from the encrypted command packets 152A-152N. The supplemental latency time period 184 can be compared against the latency mitigation limit 182 to determine whether the latency mitigation limit 182 has been approached and/or exceeded. For example, in an embodiment, the latency mitigation limit 182 may define a time value of 100 nanoseconds that is allowed to elapse when decrypting and analysis is performed one of the encrypted command packets 152A-152N. If, for example, the tactile network security application 144 spends 20 nanoseconds decrypting and spends 85 nanoseconds analyzing (i.e., determining whether one of the non-sequential command instructions 156 is in conformance with the command sequence model 161) for each of the encrypted command packets 152A-152N, then the supplemental latency time period 184 would indicate 105 nanoseconds, thereby causing the latency mitigation limit 182 to be exceeded. In another embodiment, the time elapsed for decrypting and/or analysis may not exceed the latency mitigation limit 182, but rather approach the latency mitigation limit 182 by exceeding a defined percentage of the latency mitigation limit 182, such as 90 percent of the latency mitigation limit 182. For example, an identifier of the supplemental latency time period 184 could indicate 92 nanoseconds, which exceeds 90 percent of the example of the 100 nanoseconds indicated by the latency mitigation limit 182, thereby causing the supplemental latency time period 184 to approach the latency mitigation limit 182. Determining whether the latency mitigation limit 182 has been approached and/or exceeded can allow the tactile network security application 144 to determine whether a different lightweight cryptographic primitive module could be employed to reduce processing time, thereby reducing latency experienced by the target device 120 in receiving the tactile data stream 150. In an embodiment where the latency mitigation limit 182 has been approached and/or exceeded while handling the tactile data stream 150, the method 200 can proceed along the YES path from operation 214 to operation 216. In an embodiment where the latency mitigation limit has not been approached and/or exceeded while handling the tactile data stream 150, the method 200 can proceed along the NO path to operation 220. For clarity, a discussion will proceed along the YES path to operation 216 first, and then a discussion of operation 220 will be provided below.

At operation 216, the tactile network security application 144 can generate a switch instruction 186. The switch instruction 186 can command the encrypting controller 190 to switch to an alternate lightweight cryptographic primitive module when creating encrypted command packets based on command instructions that are sent in the future. For example, the lightweight cryptographic primitive module 163' may have been used to decrypt the encrypted command packets 152A-152N of the tactile data stream, however the latency mitigation limit 182 was approached and/or exceeded while using the lightweight cryptographic primitive module 163'. Based on the latency mitigation indicator 166' for the lightweight cryptographic primitive module 165' being lower than the latency mitigation indicator 164' for the lightweight cryptographic primitive module 163', the tactile network security application 144 can determine that use of the lightweight cryptographic primitive module 165' could result in a reduced processing time, thereby decreasing network latency. In some embodiments, switching to the use of the lightweight cryptographic primitive module 165' would prevent the latency mitigation limit 182 from being approached and/or exceeded. The tactile network security application 144 can generate the switch instruction 186 that commands the encrypting controller 190 to switch from using the lightweight cryptographic primitive module 163 to using the lightweight cryptographic primitive module 165. Thus, the lightweight cryptographic primitive module 165 would be used to encrypt the command instructions 112 that are incoming to the encrypting controller 190 and have not yet been encrypted as part of the tactile data stream 150.

From operation 216, the method 200 can proceed to operation 218, where the tactile network security application 144 can deliver the switch instruction 186 by sending the switch instruction 186 to the encrypting controller 190 that was used to encrypt the encrypted command packets 152A-152N within the tactile data stream 150. In some embodiments the tactile network security application 144 can continue to receive encrypted command packets after providing the switch instruction 186 to the encrypting controller 190. Thus, in some embodiments, the method 200 can proceed from operation 218 to operation 208 as discussed above. From either operation 218 or operation 214, the method 200 can proceed to operation 220.

At operation 220, the tactile network security application 144 can provide the reconfigured tactile data stream 150' to the tactile application 126 on the target device 120. The tactile data stream 150 without the non-sequential command instructions 156 that do not conform with the command sequence model 161 (i.e., the reconfigured tactile data stream 150') can be provided to the tactile application 126. The tactile application 126 can receive the reconfigured tactile data stream 150' and execute the command instructions (i.e., the conforming non-sequential command instructions 157) contained therein to provide tactile output, such as via the actuator 130. In some embodiments, the tactile network security application 144 can decrypt all of the encrypted command packets 152A-152N prior to providing the tactile data stream 150 to the tactile application 126. It is understood that the examples provided herein are for illustration purposes only, and therefore should not be construed as limiting in any way. From operation 220, the method 200 can proceed to operation 222, where the method 200 can end.

Figure 3:
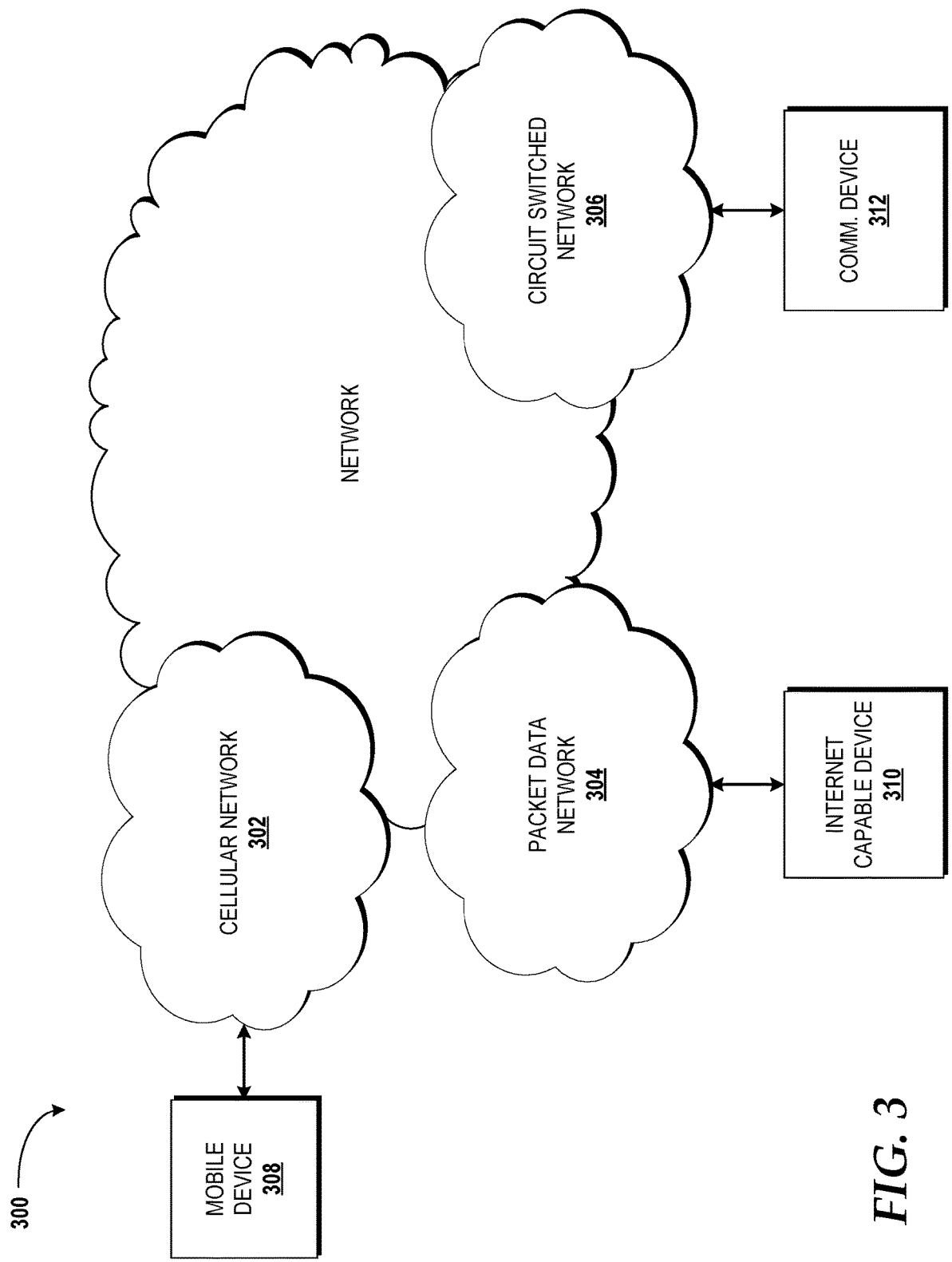
FIG. 3 is a block diagram illustrating an example network capable of implementing aspects of the concepts and technologies described herein.

Turning now to FIG. 3, details of a network 300 are illustrated, according to an illustrative embodiment. In some embodiments, the network 300 can include the network 101. The network 300 includes a cellular network 302, a packet data network 304, for example, the Internet, and a circuit switched network 306, for example, a PSTN. The cellular network 302 includes various network components such as, but not limited to, base transceiver stations ("BTSs"), NBs, eNBs, gNBs, base station controllers ("BSCs"), radio network controllers ("RNCs"), mobile switching centers ("MSCs"), MMES, short message service centers ("SMSCs"), multimedia messaging service centers ("MMSCs"), home location registers ("HLRs"), Home Subscriber Server ("HSSs"), Visitor Location Registers ("VLRs"), charging platforms, billing platforms, voicemail platforms, GPRS core network components, location service nodes, an IP Multimedia Subsystem ("IMS"), and the like. The cellular network 302 also includes radios and nodes for receiving and transmitting voice, data, and combinations thereof to and from radio transceivers, networks, the packet data network 304, and the circuit switched network 306. In some embodiments, the network 101 of FIG. 1 can operate as the packet data network 304.

A mobile communications device 308, such as, for example, a cellular telephone, a mobile terminal, a PDA, a laptop computer, a handheld computer, and combinations thereof, can be operatively connected to the cellular network 302. In some embodiments, the UE 102 can be configured as the mobile communications device 308. The cellular network 302 can be configured as a 2G GSM network and can provide data communications via GPRS and/or EDGE. Additionally, or alternatively, the cellular network 302 can be configured as a 3G UMTS network and can provide data communications via the HSPA protocol family, for example, HSDPA, EUL (also referred to as HSUPA), and HSPA+. The cellular network 302 also is compatible with 4G mobile communications standards such as LTE, or the like, as well as evolved and future mobile standards, including but not limited to LTE-Advanced, LTE-Advanced Pro and 5G.

The packet data network 304 includes various devices, for example, servers, computers, databases, and other devices in communication with one another, as is generally known. The packet data network 304 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 304 includes or is in communication with the Internet. In some embodiments, the at least some of the network 101 can be configured as a packet data network, such as the packet data network 304. The circuit switched network 306 includes various hardware and software for providing circuit switched communications. The circuit switched network 306 may include, or may be, what is often referred to as a POTS. In some embodiments, the at least some of the network 101 also can be configured as a circuit switched network, such as the circuit switched network 306. The functionality of a circuit switched network 306 or other circuit-switched network are generally known and will not be described herein in detail.

The illustrated cellular network 302 is shown in communication with the packet data network 304 and a circuit switched network 306, though it should be appreciated that this is not necessarily the case. One or more Internet-capable devices 310, for example, a PC, a laptop, a portable device, or another suitable device, can communicate with one or more cellular networks 302, and devices connected thereto, through the packet data network 304. In some embodiments, the target device 120 can be an internet-capable device 310. It also should be appreciated that the Internet-capable device 310 can communicate with the packet data network 304 through the circuit switched network 306, the cellular network 302, and/or via other networks (not illustrated).

As illustrated, a communications device 312, for example, a telephone, facsimile machine, modem, computer, or the like, can be in communication with the circuit switched network 306, and therethrough to the packet data network 304 and/or the cellular network 302. It should be appreciated that the communications device 312 can be an Internet-capable device, and can be substantially similar to the Internet-capable device 310. In the specification, the network of FIG. 3 is used to refer broadly to any combination of the networks 302, 304, 306 shown in FIG. 3. It should be appreciated that, in some embodiments, substantially all of the functionality described with reference to the network 101 can be performed by the cellular network 302, the packet data network 304, and/or the circuit switched network 306, alone or in combination with other networks, network elements, and the like, according at least to aspects of the features and operations discussed herein.

Figure 4:
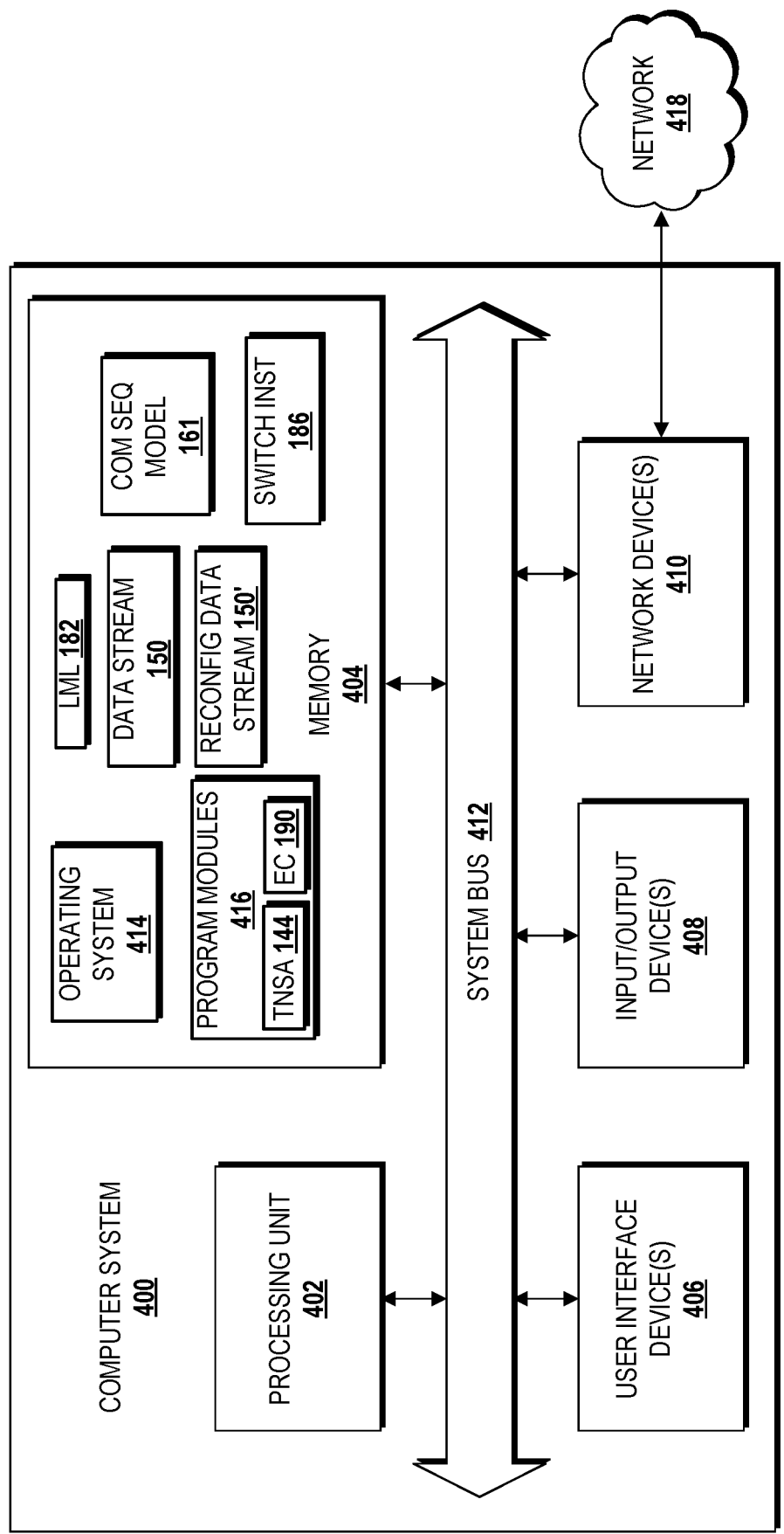
FIG. 4 is a block diagram illustrating an example computer system configured to provide, implement, and execute operations associated with handling latency sensitive communications, according to some illustrative embodiments of the concepts and technologies described herein.

Turning now to FIG. 4 is a block diagram illustrating a computer system 400 configured to provide the functionality in accordance with various embodiments of the concepts and technologies disclosed herein. The systems, devices, and other components disclosed herein can utilize, at least in part, an architecture that is the same as or at least similar to the architecture of the computer system 400. In some embodiments, one or more of the access point 188, the tactile network interface controller 138, the command sequence data store 160, and/or the target device 120 can be configured like the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein. In some embodiments, for example, the program modules 416 can include the tactile network security application 144, the encrypting controller 190 and/or other program modules. These and/or other programs can be embodied in computer-readable media containing instructions that, when executed by the processing unit 402, in some embodiments, may perform and/or facilitate performance of one or more of the method 200 described in detail above with respect to FIG. 2. According to some embodiments, the program modules 416 may be embodied in hardware, software, firmware, or any combination thereof. In some embodiments, the memory 404 also can be configured to store the command sequence model 161, the latency mitigation limit 182, the tactile data stream 150, the switch instruction 186, the lightweight cryptographic primitive modules 163, 165, 163', 165', the movement parameters 167, the command sequence data store 160 and/or other data, if desired.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid-state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 418, such as the network 101. Examples of the network devices 410 include, but are not limited to, a modem, a radio frequency ("RF") or infrared ("IR") transceiver, a telephonic interface, a bridge, a router, or a network card. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 418 may be or may include a wired network such as, but not limited to, a Wide Area Network ("WAN"), a wired Personal Area Network ("PAN"), a wired Metropolitan Area Network ("MAN"), a VoIP network, an IP/MPLS network, a PSTN network, an IMS network, an EPC network, or any other mobile network and/or wireline network.

Figure 5:
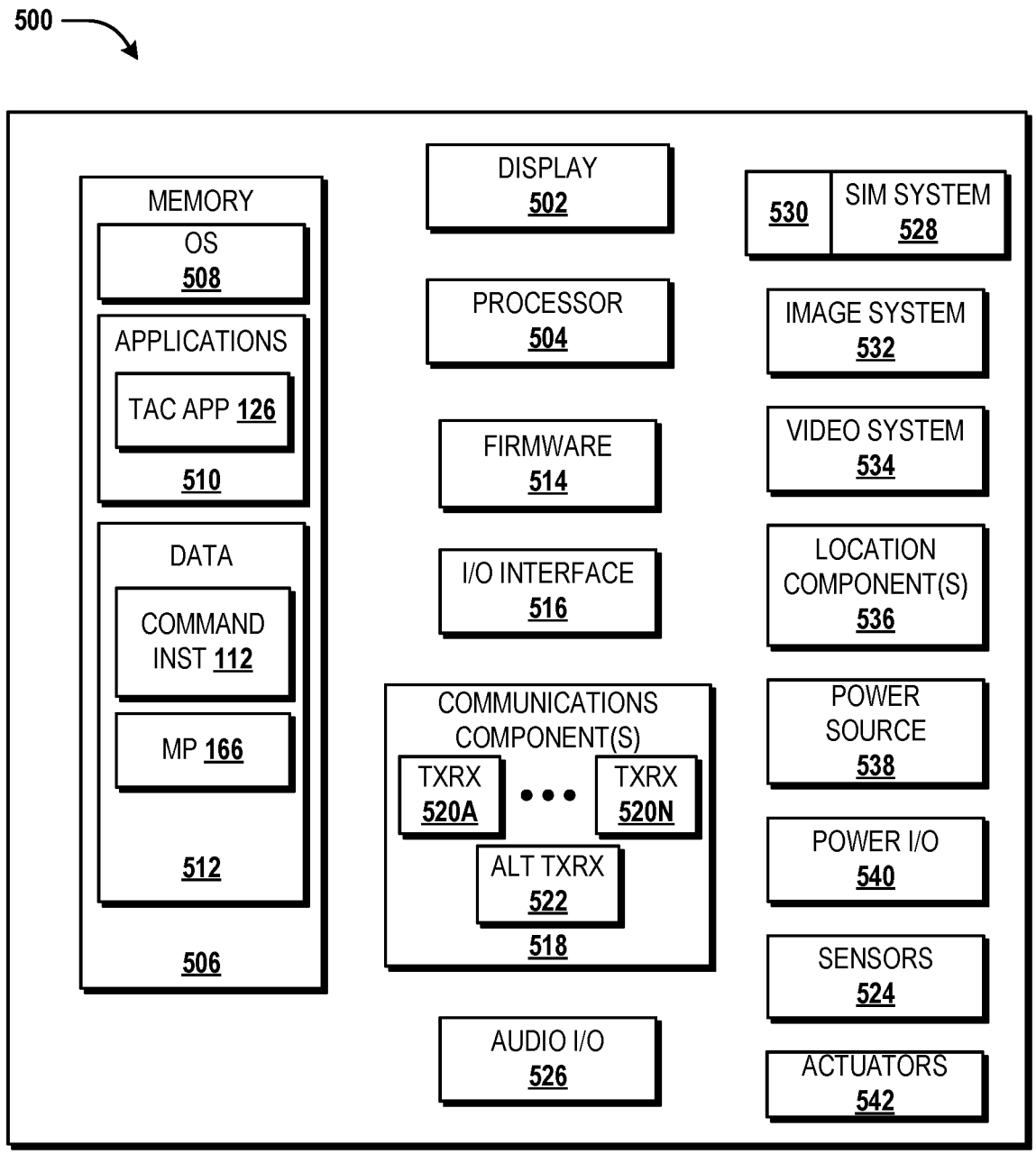
FIG. 5 is a block diagram illustrating an example of user equipment capable of implementing aspects according to embodiments of the concepts and technologies described herein.

Turning now to FIG. 5, an illustrative user equipment 500 and components thereof will be described. In some embodiments, one or more of the UE 102 and/or the target device 120 (shown in FIG. 1) can be configured like the user equipment 500. It is understood that the user equipment 500 can be configured to take the form of a mobile communications device, a tablet, a wearable computing device (e.g., a smart watch, smart glasses, glove etc.), a heads-up display computer system, a vehicle computing system, an attachable computing device, a camera, a gaming system, an appliance (e.g., a refrigerator, an oven, a microwave, etc.), a television, a handheld device, a combination thereof, or other user equipment that can implement network communications. The user equipment 500 can be configured to provide tactile out, such as via an actuator, a motor, sensors, such as discussed with respect to the target device 120 from FIG. 1. It is understood that the examples discussed above are used for illustration purposes only, and therefore should not be construed to limit the scope of the disclosure in any way. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the user equipment 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The user equipment 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the user equipment 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT COR- PORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in interacting or otherwise entering/deleting data, entering and setting command sequence models (e.g., the command sequence model 161), configuring settings (e.g., the tactile settings 114 and/or movement parameters 167), manipulating address book content and/or settings, multimode interaction, interacting with other applications 510, and otherwise facilitating user interaction with the operating system 508, the applications 510, and/or other types or instances of data 512 that can be stored at the user equipment 500. The data 512 can include, for example, one or more identifiers, and/or other applications or program modules. In some embodiments, the data 512 can include one or more of the command instructions 112, the tactile data stream 150, the movement parameters 167, and/or other data sent among and/or between the UE 102 and the target device 120. According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. In some embodiments, the applications 510 can include the tactile application 126. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The user equipment 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RHO port, a proprietary port, combinations thereof, or the like. In some embodiments, the user equipment 500 can be configured to synchronize with another device to transfer content to and/or from the user equipment 500. In some embodiments, the user equipment 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the user equipment 500 and a network device or local device.

The user equipment 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The user equipment 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. The sensor 128 can be configured as the sensor 524 of the user equipment 500. Additionally, audio capabilities for the user equipment 500 may be provided by an audio I/O component 526. The audio I/O component 526 of the user equipment 500 can include one or more speakers for the output of audio signals, one or more microphones for the collection and/or input of audio signals, and/or other audio input and/or output devices. In some embodiments, the user equipment 500 can include an actuator 542, a motor, or combination thereof. The actuator 542 can provide tactile output via articulation and movement based on command instructions that are executed by the tactile application 126, such as discussed with respect to FIG. 1.

The illustrated user equipment 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the user equipment 500 are contemplated, it should be understood that these embodiments are illustrative, and should not be construed as being limiting in any way.

The user equipment 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The user equipment 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The user equipment 500 also can include one or more location components 536. The location components 536 can be configured to send and/or receive signals to determine a geographic location of the user equipment 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the user equipment 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the user equipment 500. Using the location component 536, the user equipment 500 can generate and/or receive data to identify its geographic location, or to transmit data used by other devices to determine the location of the user equipment 500. The location component 536 may include multiple components for determining the location and/or orientation of the user equipment 500.

The illustrated user equipment 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the user equipment 500 can include additional and/or alternative components, the above embodiment should be understood as being illustrative of one possible operating environment for various embodiments of the concepts and technologies described herein. The described embodiment of the user equipment 500 is illustrative, and should not be construed as being limiting in any way.

Based on the foregoing, it should be appreciated that concepts and technologies directed to latency sensitive tactile network security interfaces have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:
1. A system comprising:
 a processor; and
 a memory that stores computer-executable instructions that, in response to execution by the processor, cause the processor to perform operations comprising:
  identifying, from a data stream, encrypted command packets that are being sent to a tactile application, obtaining a command sequence model based on the encrypted command packets being sent to the tactile application, decrypting at least some of the encrypted command packets based on the command sequence model, wherein decrypting the encrypted command packets identifies non-sequential command instructions, determining, based on the command sequence model, that at least some of the non-sequential command instructions do not conform to the command sequence model, and dropping the at least some of the non-sequential command instructions that do not conform to the command sequence model from the data stream.

2. The system of claim 1, wherein the command sequence model includes a lightweight cryptographic primitive module.

3. The system of claim 2, wherein the operations further comprise:

determining that decrypting at least some of the encrypted command packets occurs over a time period that approaches a latency mitigation limit; and in response to determining that decrypting at least some of the encrypted command packets approached the latency mitigation limit, generating a switch instruction that commands an encrypting controller to switch to an alternate lightweight cryptographic primitive module when creating encrypted command packets.

4. The system of claim 2, wherein the operations further comprise providing, to a target device associated with the tactile application, the data stream without the non-sequential command instructions that do not conform to the command sequence model.

5. The system of claim 4, wherein the tactile application controls a sensor and an actuator that facilitates physical movement of the target device based on the data stream that is without the non-sequential command instructions that do not conform to the command sequence model.

6. The system of claim 1, wherein the command sequence model identifies movement parameters that define at least one of a range of motion, an acceleration rate, a grasping force, an angular rotation rate, a vibration rate, a haptic feedback duration, or any combination thereof.

7. The system of claim 1, wherein the encrypted command packets conform to a user datagram protocol.

8. A method comprising:

identifying, by a tactile network interface controller, encrypted command packets that are being sent as a data stream to a tactile application;

obtaining, by the tactile network interface controller, a command sequence model based on the encrypted command packets being sent to the tactile application;

decrypting, by the tactile network interface controller, at least some of the encrypted command packets based on the command sequence model, wherein decrypting the encrypted command packets identifies non-sequential command instructions;

determining, by the tactile network interface controller based on the command sequence model, that at least some of the non-sequential command instructions do not conform to the command sequence model; and dropping, by the tactile network interface controller, the at least some of the non-sequential command instructions that do not conform to the command sequence model from the data stream.

9. The method of claim 8, wherein the command sequence model includes a lightweight cryptographic primitive module.

10. The method of claim 9, further comprising:

determining, by the tactile network interface controller, that decrypting at least some of the encrypted command packets occurs over a time period that approaches a latency mitigation limit; and in response to determining that decrypting at least some of the encrypted command packets approached the latency mitigation limit, generating, by the tactile network interface controller, a switch instruction that commands an encrypting controller to switch to an alternate lightweight cryptographic primitive module when creating encrypted command packets.

11. The method of claim 9, further comprising providing, by the tactile network interface controller to a target device associated with the tactile application, the data stream without the non-sequential command instructions that do not conform to the command sequence model.

12. The method of claim 11, wherein the tactile application controls a sensor and an actuator that facilitates physical movement of the target device based on the data stream that is without the non-sequential command instructions that do not conform to the command sequence model.

13. The method of claim 11, wherein the command sequence model identifies movement parameters that define at least one of a range of motion, an acceleration rate, a grasping force, an angular rotation rate, a vibration rate, a haptic feedback duration, or any combination thereof.

14. The method of claim 8, wherein the encrypted command packets conform to a user datagram protocol.

15. A computer storage medium having computer-executable instructions stored thereon that, in response to execution by a processor of a system, cause the processor to perform operations comprising:

identifying, from a data stream, encrypted command packets that are being sent to a tactile application;

obtaining a command sequence model based on the encrypted command packets being sent to the tactile application;

decrypting at least some of the encrypted command packets based on the command sequence model, wherein decrypting the encrypted command packets identifies non-sequential command instructions;

determining, based on the command sequence model, that at least some of the non-sequential command instructions do not conform to the command sequence model; and dropping the at least some of the non-sequential command instructions that do not conform to the command sequence model from the data stream.

16. The computer storage medium of claim 15, wherein the command sequence model includes a lightweight cryptographic primitive module.

17. The computer storage medium of claim 16, wherein the operations further comprise:

determining that decrypting at least some of the encrypted command packets occurs over a time period that approaches a latency mitigation limit; and in response to determining that decrypting at least some of the encrypted command packets approached the latency mitigation limit, generating a switch instruction that commands an encrypting controller to switch to an alternate lightweight cryptographic primitive module when creating encrypted command packets.

18. The computer storage medium of claim 15, wherein the operations further comprise providing, to a target device associated with the tactile application, the data stream without the non-sequential command instructions that do not conform to the command sequence model.

19. The computer storage medium of claim 18, wherein the tactile application controls a sensor and an actuator that facilitates physical movement of the target device based on the data stream that is without the non-sequential command instructions that do not conform to the command sequence model.

20. The computer storage medium of claim 19, wherein the command sequence model identifies movement parameters that define at least one of a range of motion, an acceleration rate, a grasping force, an angular rotation rate, a vibration rate, a haptic feedback duration, or any combination thereof.

* * * * *